United States Patent [19]
Baxter

[11] 3,939,995
[45] Feb. 24, 1976

[54] VALVE PLACEMENT IN A MULTI-PLY, INFLATABLE BAG

[75] Inventor: Robert Olin Baxter, Camden, Ark.

[73] Assignee: International Paper Company, New York, N.Y.

[22] Filed: Nov. 1, 1974

[21] Appl. No.: 519,814

[52] U.S. Cl............................ 214/10.5 D; 105/468
[51] Int. Cl.[2]........................................... B60P 7/14
[58] Field of Search...... 214/10.5 D; 105/468; 9/13; 5/348

[56] References Cited
UNITED STATES PATENTS

| | | | |
|---|---|---|---|
| 2,853,720 | 9/1958 | Friedlander............................ | 9/13 X |
| 3,414,140 | 12/1968 | Feldkamp...................... | 214/10.5 D |
| 3,554,135 | 1/1971 | Duvall et al. .................. | 214/10.5 D |

Primary Examiner—Frank E. Werner
Attorney, Agent, or Firm—Ronald A. Schapira

[57] ABSTRACT

A multi-ply, inflatable bag, formed from: an inner, inflatable bladder; an outer, protective shell enclosing the bladder; and a valve connected to the bladder and extending outwardly of the bladder and the shell; the valve being located in the eyelet of a rigid grommet; the grommet being secured to the shell about a fold in an edge of the shell, to protect the valve from damage when the bag is crushed; and the grommet also being secured to the shell over a distance, on both sides of the fold and transverse to the fold, which is at least about equal to the distance that the valve extends outwardly of the shell, to protect the valve against damage when the bag is scuffed, rubbed, or struck near the valve.

5 Claims, 2 Drawing Figures

VALVE PLACEMENT IN A MULTI-PLY, INFLATABLE BAG

BACKGROUND OF THE INVENTION

This invention relates to an improved placement for the valve in an inflatable, multi-ply bag. This invention is particularly concerned with the valve placement in dunnage bags and the like.

Multi-ply, inflatable bags as shoring devices and as containers for liquids are well known. See, for example, U.S. Pat. Nos. 2,674,206, 3,072,270, 3,204,825, 3,365,116, 3,462,027, 3,554,135, 3,730,240 and 3,747,954 and Canadian Pat. No. 703,322. Typically, such multi-ply, inflatable bags have included a relatively flexible, inner, inflatable bladder, a valve, and a relatively strong and rigid, outer, protective shell enclosing the bladder and valve. Generally, the protective shells have included folds adapted to allow the bags to lie flat when the bladders are uninflated and to permit the shells to expand when the bladders are inflated. See, for example, U.S. Pat. Nos. 3,072,270, 3,365,116 and 3,462,027 and Canadian Pat. No. 702,322.

When multi-ply bags have been intended for use as shoring devices, the protective shells have typically been made of relatively strong but inexpensive, abrasion and puncture resistant materials, such as burlap, rayon fabric and kraft paper, as well as plastics, such as polypropylene, and multi-layer laminates of such materials. In such multi-ply bags, the inner bladders have typically been made of inexpensive, thin wall, rubber or plastic sheet materials, such as polyethylene.

On the other hand, when the multi-ply bags have been intended for use as containers for liquids, the bladders have usually been made of a relatively strong and thick, rubber or plastic material, which is inert to the contents of the bladder and which provides some barrier properties. In such bags, the protective shells also have typically been formed from relatively strong and thick, rubber or plastic materials which are both abrasion and puncture resistant as well as leak resistant.

Such multi-ply, inflatable bags have provided relatively inexpensive and durable, liquid containers and shoring devices. However, the valves in such bags have tended to be relatively prone to damage from the mishandling or abuse of the bags. The valves have frequently been broken when the protective shells have been forcefully scuffed, rubbed or struck in the area of the valve. The valves have also been quite susceptible to being crushed, particularly when uninflated bags have been stored in stacks. The valves in dunnage bags have been especially prone to being damaged by being scuffed, rubbed, struck or crushed.

There has been an unfilled need therefore for an improved, multi-ply, inflatable bag in which the valve is more resistant to failure due to abuse or rough handling of the multi-ply bag in the area of the valve.

SUMMARY OF THE INVENTION

In accordance with this invention, in a multi-ply, inflatable bag, which includes: an inner, inflatable bladder; an outer, protective shell enclosing the bladder; a valve connected to the bladder, extending outwardly of the bladder and the shell; and a rigid grommet, the valve being located in the eyelet of the grommet, the improvement which comprises: the grommet being secured to the shell about a fold in an edge of the shell. By this improved, valve placement, a multi-ply, inflatable bag is provided having increased durability and resistance to crushing abuse or mishandling of the bag in the area of the valve.

In accordance with another aspect of this invention, an improvement is provided in a multi-ply bag, comprising: securing the grommet to the shell, about a fold in an edge of the shell, over a distance, on both sides of the fold and transverse to the fold, which is at least about equal to the distance that the valve extends outwardly of the shell. By this improved valve placement, a multi-ply bag is provided having increased durability and resistance to scuffing, rubbing or striking, as well as crushing, abuse or mishandling of the bag in the area of the valve.

DETAILED DESCRIPTION OF THE INVENTION

Figure 1:
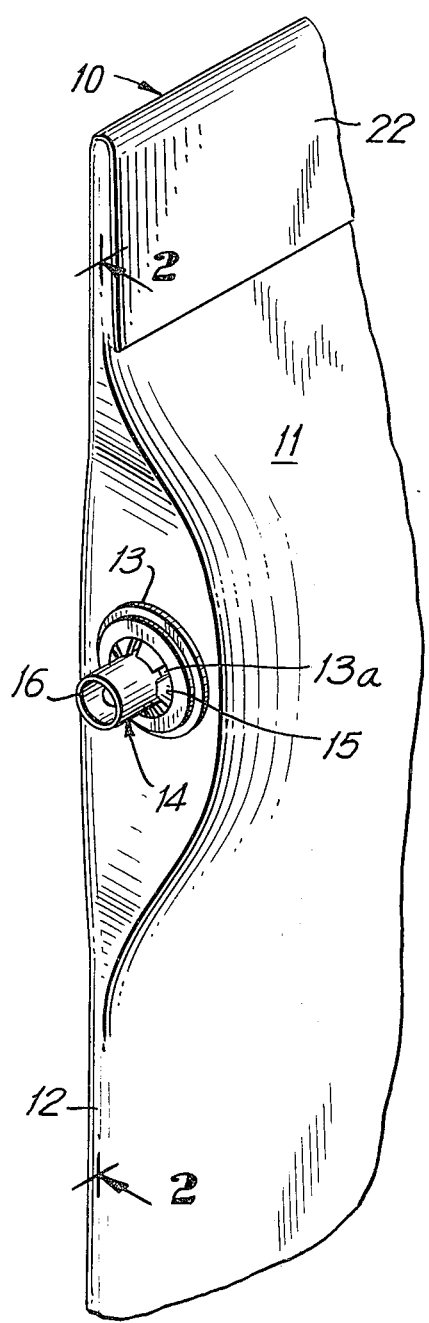
FIG. 1 is a fragmentary, perspective view of a grommet provided in a fold in an edge of an outer, protective shell of a multi-ply, inflatable bag. A valve extends outwardly of the bag, through the eyelet in the grommet.

Shown in FIG. 1 is a portion of a multi-ply, inflatable bag, specifically a dunnage bag, generally 10, of this invention. The bag 10 has an outer, protective shell, generally 11. The bag 10 is folded along a fold line or fold 12 at an edge of the shell 11, and an annular, rigid grommet, generally 13, is attached to the protective shell 11 about the fold 12. Inserted through the eyelet 13$d$ of the grommet 13 is a valve, generally 14, which is held in the eyelet of the grommet by a retaining clip 15.

Figure 2:
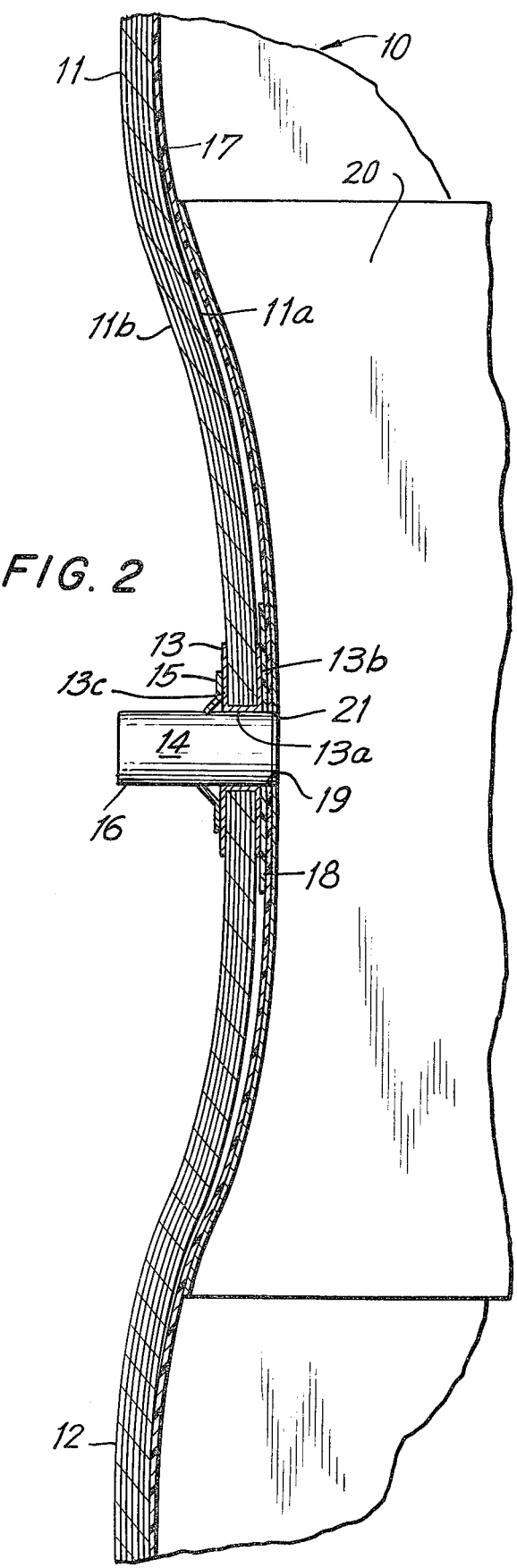
FIG. 2 is a fragmentary, sectional view taken along line 2—2 in FIG. 1, showing the relationship of the inner, inflatable bladder, the outer, protective shell, the grommet, attached to the protective shell, and the valve connected to the bladder and extending outwardly of the protective shell, through the eyelet of the grommet.

As seen in FIG. 2, the multi-ply bag 10 includes an inner, inflatable bladder 17, which is covered by the protective shell 11 and which is connected to the valve 14. The stem 16 of the valve 14 extends outwardly of the bladder 17 and shell 11 through the grommet eyelet 13$a$. The grommet 13 has an inner, annular flange 13$b$ and an outer, annular flange 13$c$, which are respectively adjacent the inner surface 11$a$ and the outer surface 11$b$ of the protective shell 11. The grommet flanges 13$b$ and 13$c$ tightly hold, between them, the inner and outer shell surfaces 11$a$ and 11$b$ to secure the grommet 13 to the shell 11. The retaining clip 15 prevents the valve 14 from slipping out of the grommet eyelet 13$a$. The bladder 17 is bonded to an annular flange 18 of the valve 14 about a hole 19, in the bladder 17, through which the bladder can be inflated or deflated. Inside the bladder 17 is a sheet of a flexible material 20. The sheet 20 has a hole 21 which coincides with the hole 19 in the bladder 17.

As also seen in FIG. 2, the fold 12 in an edge of the shell 11 of the bag 10, in the area of the grommet 13, is indented. By the use of the rigid grommet 13, which is secured to the shell 11 over a distance, on both sides of and transverse to the fold 12, which is at least about equal to the distance that the valve 14 extends outwardly of the shell 11, the entire valve 14, including its stem 16, lies below or substantially below the line connecting the unindented portions of the fold line 12. Preferably, the grommet 13 is secured to the shell 11, on both sides of and transverse to the fold 12, over a distance at least equal to, especially a distance equal to, the distance that the valve 14 extends outwardly of the shell 11, whereby the valve 14 is wholly below the line connecting the unindented portions of the fold 12.

In the bag 10 shown in FIGS. 1 and 2, the grommet 13 and valve 14 are centered on the fold line 12 in the edge of the shell. The annular grommet flanges 13b and 13 c are secured to the inner and outer shell surfaces 11a and 11b over a distance, on both sides of and transverse to the fold 12, at least about equal, preferably at least equal, to the distance that the valve 14 extends outwardly of the shell 11. For this purpose, the radii of the annular grommet flanges 13b and 13c, as measured from the center of the grommet eyelet 13a, are at least about equal, preferably at least equal, to the distance that the valve 14 extends outwardly of the shell surface 11b. As a result, the valve 14 and its stem 16 are shielded, in accordance with this invention, against injury from the scuffing, rubbing, striking or crushing of the bag 10 in the neighborhood of the valve 14.

Securing the grommet 13 to the shell 11 at the fold 12 in the edge of the bag 10 provides the protection for the valve 14 against crushing. This protection against crushing is obtained because a crushing force, as exerted in the area of the valve 14, for example, by a stack of bags 10 or the like, would not be exerted against the valve 14 or its stem 16. Rather, a crushing force would be exerted against the outward, edge portions of the grommet flanges 13b and 13c transverse to the fold 12. This protective feature against crushing is not dependent upon the distance over which the grommet is secured to the shell 11 transverse of the fold 12, and, in fact, securing the grommet 13 to the shell 11 over any significant distance, transverse to and on both sides of the fold 12, will provide protection for the valve against crushing in accordance with the invention. However, securing substantial portions of the grommet 13, i.e., at least about equal to the distance that the valve 14 extends outwardly of the shell 11, on either side of and transverse to the fold line 12, provides the protective indent in the fold which protects the valve from damage by scuffing, rubbing or striking abuse or mishandling of the bag 10.

While the particular placement and arrangement of the grommet 13 and valve 14 in relation to the protective shell 11 and bladder 17 are unique and provide, in cooperation, new features in the bag 10 for protecting the valve 14 and its stem 16 from damage, it is considered that the elements, themselves, taken individually, are conventional.

In the bag 10 of this application, the outer protective shell 11 can be any conventional, relatively strong and inexpensive, protective material for the shell of a multi-ply bag, such as the materials of U.S. Pat. Nos. 2,674,206, 3,072,270, 3,204,825, 3,365,116, 3,462,027, 3,554,135, 3,730,240 and 3,747,954 or Canadian Pat. No. 703,322. As seen in FIG. 2, the protective shell 11 comprises a plurality of plies of material. When the bag 10 is a dunnage bag, the shell 11 preferably includes a plurality of kraft paper plies. The ends 22 of the shell 11 can be closed in any conventional manner, such as by the end constructions in the above patents.

In the bag 10, the bladder 17 can be formed of any conventional, flexible, plastic or rubber material adapted for either a shoring device or a liquid container, such as the materials of the above patents. When the multi-ply bag 10 is a dunnage bag, the bladder 17 is preferably a conventional, polyethylene tube, the ends of which have been sealed.

In the bag 10, the valve 14 can be any conventional valve, such as is shown in the above patents. Preferably, the valve 14 has an annular flange 18 made of a plastic material, such as polyethylene, which can be heat-sealed to the bladder 17 to form an air tight seal about the hole 19 in the bladder 17.

Likewise, any conventional, metal or plastic, rigid grommet 13, having an eyelet 13a large enough to accommodate the valve 14 and its valve stem 16 and adapted to be secured to the shell 11, transverse to the fold 12, can be utilized in the bag 10, such as the two piece grommet disclosed in U.S. Pat. No. 3,365,116. Preferably, the grommet is an annular grommet having flanges 13b and 13c of a radius about equal to or greater than the distance that the valve 14 extends outwardly of the shell 11. However, grommets 13 having non-annular flanges may also be utilized for providing protection against rubbing, scuffing or striking abuse of the valve 14, so long as the flanges 13b and 13c, transverse to and on both side of the fold 12, extend a distance at least about equal to the distance that the valve 14 extends outwardly of the shell 11. In the multi-ply bags 10 of this invention, it is especially preferred that the opposing faces of the grommet flanges 13b and 13c be adapted to be crimped to grip between them the inner and outer surfaces 11a and 11b of the shell 11.

The flexible sheet 20, bonded to the bladder 17, can also be any conventional, flexible material, such as a sheet of craft paper. The purpose of the sheet material 20, which surrounds the hole 19 in the bladder 17, is to dampen vibrations that may be set up in the dunnage bag 10 and bladder 17 when they are inflated by forcing air through the valve 14. The valve flange 18 and flexible sheet 20 can be bonded to the bladder 17, about the hole 19, in any conventional manner. Preferably, the bladder 17 is a thermoplastic material adapted to be heat-seal bonded to the valve flange 18 and the flexible sheet 20.

The improved, multi-ply bag of this invention, wherein the valve and grommet are placed at a fold in an edge of the protective shell, can be assembled in a conventional manner. For example, the dunnage bag 10 can be suitably obtained by first connecting the valve 14 to the opening 19 in the bladder 17. The bladder 17 is then inserted in a creased, protective, tubular shell 11, preferably a multi-ply paper, tubular shell. The shell 11 has a hole in the fold line 12, formed by the crease, and a grommet 13 is inserted in the hole. The flanges 13b and 13c of the grommet 13 are pushed tightly together to secure the grommet to the inner and outer surfaces 11a and 11b of the shell and to indent the shell about the grommet. The valve stem 16 of the valve 14 is inserted through the eyelet 13a of the grommet 13, and the valve stem 16 is held in the grommet by the use of a retaining clip 15, such as a Tinnerman retaining clip. The ends 22 of the multi-ply shell 11 are then closed in a conventional manner.

In accordance with the improved, valve placement in a multi-ply, inflatable bag of this invention, many variations can be made in the conventional elements utilized.

For example, while it is preferred that the grommet be secured to the protective shell 11 over a distance, on both sides of and transverse to the fold 12, at least equal to the distance that the valve 14 extends outwardly of the shell 11, this is not necessary in order to provide some measure of protection for the valve 14 and valve stem 16 against the scuffing, rubbing or striking of the bag 10. Where a transverse distance, on both sides of the fold, somewhat less that the valve height is secured, a significant portion of the valve 14 still is protected against being rubbed, scuffed or struck in accordance with this invention. In such a case only a portion of the valve is above the line connecting the unindented portions of the fold line 12, and the risk of damage from rubbing, scuffing, or striking this exposed part of the valve stem 16 may be acceptable for certain multi-ply bags or for certain uses thereof. In addition, the protection afforded against crushing the valve 14 located at a fold 12 in the shell 11 is not significantly diminished by reducing the distance, transverse to and on either side of the fold 12, along which the grommet 13 is secured to the shell 11.

Likewise, while it is preferred that both the grommet flanges 13b and 13c be secured to the inner and outer surfaces 11a and 11b of a multi-ply shell 11 over a distance, transverse to and on both sides of the fold 12, at least about equal to the distance that the valve 14 extends outwardly of the shell 11, this is not necessary where the protective shell 11 is a single ply material. In such a case, both the inner and outer grommet flanges 13b and 13c need not be secured to the shell 11 over the same distance transverse to the fold 12 to provide full protection for the valve against the rubbing, scuffing or striking of the bag in the area of the valve. Rather, with a single-ply shell 11, only the inner flange 13b need be secured to the inner shell surface 11a over a distance, on both sides of and transverse to the fold line, at least about equal to the height of the valve in order to protect the valve against rubbing, scuffing or striking abuse. The outer, grommet flange 13c need only be of sufficient area to secure the grommet 13 to the shell 11 between the grommet flanges 13b and 13c.

It is also considered that the invention and many of its attendant advantages will be obvious from the foregoing description and that it will be likewise apparent that various changes may be made in the form, construction and arrangement of the parts without departing from the spirit and scope of the invention or sacrificing all of its material advantages, the form hereinbefore described being merely preferred embodiments thereof.

I claim:

1. In a multi-ply, inflatable bag, which includes an inner, inflatable bladder; an outer, protective shell, enclosing the bladder and having a fold line defining a fold in an edge thereof; a valve connected to the bladder and extending outwardly of the bladder and the shell; and a rigid grommet; the valve being located in the eyelet of the grommet; the improvement which comprises: the grommet being secured to the shell about the fold in an edge of the shell, whereby the edge of the shell is indented in the area of the grommet and the area of the indent in the shell being substantially greater than the shell contact area of the grommet.

2. The multi-ply bag of claim 1 wherein the grommet is secured to the shell over a distance, on both sides of the fold and transverse to the fold, which is at least about equal to the distance that the valve extends outwardly of the shell.

3. The multi-ply bag of claim 2 wherein the grommet is secured to the shell over a distance, on both sides of and transverse to the fold, which is at least equal to the distance that the valve extends outwardly of the shell.

4. The multi-ply bag of claim 3 wherein the grommet is secured to the shell over a distance, on both sides of and transverse to the fold, which is equal to the distance that the valve extends outwardly of the shell.

5. The multi-ply bag of claim 2 wherein the grommet has annular flanges, the radii of which are about equal to the distance, transverse of the fold, over which the grommet is secured to the shell.

* * * * *